United States Patent [19]

Wilson

[11] 3,798,441

[45] Mar. 19, 1974

[54] ILLUMINATOR FOR EXPOSING COLOR TELEVISION TUBES DURING THE MANUFACTURING PROCESS THEREOF AND THE LIKE

[75] Inventor: Patrick Oliver Wilson, Sunnyvale, Calif.

[73] Assignee: Illumination Industries, Inc., Sunnyvale, Calif.

[22] Filed: Oct. 16, 1972

[21] Appl. No.: 297,729

[52] U.S. Cl. ......... 240/41.35 R, 240/41.1, 240/41.3, 240/41.35 C, 240/41.35 F

[51] Int. Cl. ............................................. F21v 7/00

[58] Field of Search .......... 240/1.4, 41.1, 41, 41.15, 240/41.3, 41.35, 41.35 C, 41.35 D, 41.35 F, 103, 41.37, 41.35 A; 95/1

[56] References Cited

UNITED STATES PATENTS

| | | | |
|---|---|---|---|
| 3,087,381 | 4/1963 | Moffatt | 240/41.35 R X |
| 1,703,494 | 2/1929 | Lewis | 240/41.3 |
| 1,163,192 | 12/1915 | Adams | 240/41.35 D |
| 1,633,838 | 6/1927 | Zimmerman | 240/41.35 D |
| 1,682,387 | 8/1928 | Lewis | 240/41.3 |
| 2,285,408 | 6/1942 | Blauvelt | 240/41.3 |
| 3,437,804 | 4/1969 | Schaefer et al. | 240/41.35 R |
| 3,700,881 | 10/1972 | Slomski | 240/41.35 R |

*Primary Examiner*—Richard M. Sheer
*Attorney, Agent, or Firm*—Limbach, Limbach & Sutton

[57] ABSTRACT

An apparatus and method for projecting light from a high intensity light source onto an object, utilizing first and second double focal point reflectors, and a focusing reflector in concert so as to concentrate the light, traveling from the source, essentially, at a point where the light is gathered and projected onto the object to be illuminated.

8 Claims, 5 Drawing Figures

ILLUMINATOR FOR EXPOSING COLOR TELEVISION TUBES DURING THE MANUFACTURING PROCESS THEREOF AND THE LIKE

BACKGROUND OF THE INVENTION

The present invention relates to a novel apparatus and method for illuminating objects with, essentially, a point light source, particularly useful, although not limited to, exposing color television tubes during the manufacturing process thereof.

With reference to the manufacturing of television tubes, there has been a requirement for an efficient, high intensity light source to expose color television tubes, producing the different colors found on the screens of color television tubes. The color spots, usually red, green and blue, are positioned in clusters of three, one spot for each color, by sequentially projecting a high intensity white light at the desired position and providing, at the same time, an appropriate color developing slurry for each color spot. When developed the back surface of the color television tube screen contains a multitude of three spot color clusters that fluoresce when bombarded by electron guns during the normal operation of a color television.

Presently, a typical exposing illuminator used for manufacturing television tubes consists of a one kilowatt arc lamp as a light source and a light fiber or optional condensing element, which is tapered to a point to serve as the light projection element. Such illuminators are only about 10 percent efficient, since much light is lost being gathered from only one side of the arc lamp light source, and this inefficiency requires the provision of air cooling. In a typical color television tube manufacturing plant, the compressors providing air cooling of the illuminators draw off a substantial portion of the total electrical power within the plant. Any failure of the compressors results in destruction of the arc lamps used at light sources due to the rapid temperature rises which occur. Furthermore, the compressors are noisy and air cooling produces a bothersome hissing sound in the production room.

Also, the arc lamp light sources have a relatively short life, typically about 80 to 100 hours, and are difficult and expensive to replace.

SUMMARY OF THE INVENTION

It is therefore an object of the present invention to provide an efficient light projection apparatus and method to illuminate objects.

Another object of the invention is to provide an efficient virtual point light for exposing color television tubes during their manufacture.

A further aspect of this invention is to provide an illumination distribution across a color television tube to be exposed to light during its manufacture such that the peripheral portions of the tube face receive a higher intensity light than the center area of the tube to compensate for the lesser intensity electron gun bombardment at the peripheral portions of the tube face during the normal operation of the color television.

In accordance with the present invention, an illuminator is provided having a light source such as an arc lamp positioned within a first double focal point reflector, such as an ellipsoid of revolution, with a mirrored concave surface having a near focal point, one nearest to the reflecting surface and a far focal point, one furthest from the reflecting surface.

The first ellipsoidal surface is provided with a rear aperture through which a light source such as an arc lamp is passed. The light source is mounted within the ellipsoidal cavity by fastening it to a suitable lamp support which positions the arc at the near focal point of the ellipsoidal reflector.

The lamp support is itself supported by suitable means such as spider fingers originating from an outer supporting base such as a cylindrical ring. The first ellipsoidal reflector fits into the outer supporting base. A second ellipsoidal reflector is also mounted on the supporting base end to end with the first ellipsoidal reflector.

A light gathering and projecting means such as a sapphire or suprasil hemisphere is positioned at the far focal point of the first ellipsoidal reflector, to collect light, originating at the source and reflected from the first ellipsoidal reflector, and to project the light, essentially as a point source, in the desired distribution upon an object to be illuminated, such as a color television tube. A focusing reflector such as a conelike shaped mirror having a concave surface is placed along the axis of the arc lamp, between the arc lamp and the light gathering means to reflect light emanating from the source and reflected from the second ellipsoidal reflector to the light gathering means, thereby illuminating the area blocked out by the arc lamp cathode and the mounting means for the light source.

The light gathering means may be positioned at various distances from the far focal point of the first double focusing reflector to provide different light intensity distributions on the object illuminated. Likewise changing the shape of material of the light gathering means also changes the resulting light intensity distributions on the object illuminated.

A cover plate is provided to surround the rear aperture of the first ellipsoidal surface to absorb stray light and desirably, is water cooled to eliminate hot spots on the plate.

Because the improved illuminator of the present invention is so much more efficient than the previous illuminators referred to above, only a 350 watt arc lamp is required contrasted to a 1,000 watt lamp used in the prior art to provide the same ultimate illumination. Besudes using less electricity, the small watt lamp has a life span of eight times that of the larger lamp.

DESCRIPTION OF THE PREFERRED EMBODIMENT

Figure 1:
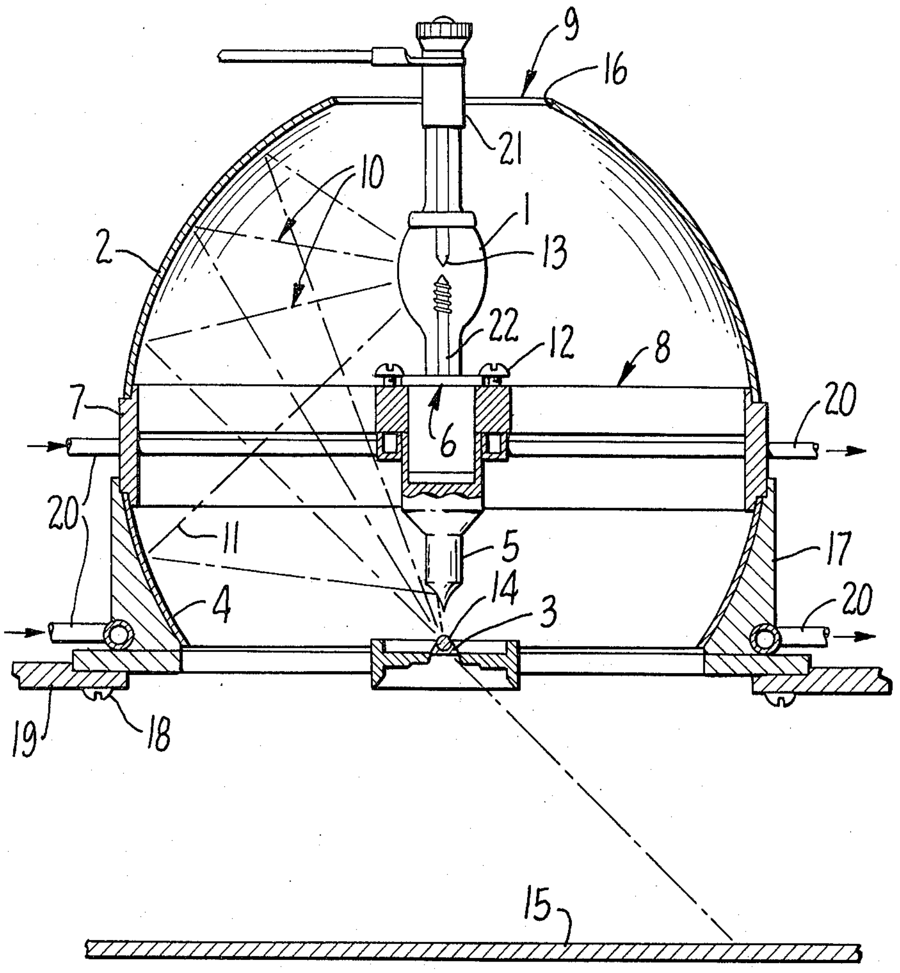
FIG. 1 is an axial section of the illuminator.

With reference to FIG. 1, the apparatus comprises a light source such as an arc lamp (1) such as model no. 1–350, manufactured by Illumination Industries, Sunnyvale, Calif. The lamp (1) is arranged so that its arc (0.110 inch × 0.70 inch) is placed approximately at the near or first focal point (13) of a first double focal point reflector (2). The surface of reflector (2), for example, defines an ellipsoid of revolution. The reflector (2) is made of aluminum and is provided with magnesium fluoride as the reflecting surface.

A characteristic of double focal reflectors being that a point source of light fixed at one focal point will focus to a point at "second focal point", light gathering and projecting means such as a sapphire or suprasil translucent hemisphere (3) is positioned at the far or second focal point (14) of the first ellipsoidal reflector (2). A second double focal point reflector (4), also made of aluminum and coated with magnesium fluoride is axially aligned with and in an abutting relationship to the first ellipsoidal reflector (2). The reflector (4) is positioned along the major axis of reflector (2) so that the far or first focal point of reflector (4) coincides with the near focal point of reflector (2) and the near or second focal point of reflector (4) is spaced from the far focal point of reflector (2). In addition reflectors (2) and (4) may be hyperboles of revolution.

A focusing reflector such as a focusing cone (5) having a concave surface is secured between the light gathering and projecting means (3) and the first ellipsoidal reflector (2) approximately at said near focal point of the second ellipsoidal reflector. The axis of cone (5) is substantially coincident with the major axis of the first ellipsoidal reflector (2). In practice, the first ellipsoidal reflector and the second ellipsoidal reflector may be constructed by dividing a single mirror into two mirrors.

Light rays (10) emanating from the light source (1) strike the first ellipsoidal reflector (2) and are reflected to the light gathering means (3) and projected to an object 15 to be illuminated (15).

Other light rays (11) reflected by the second ellipsoidal reflector (4), incapable of being captured by the light gathering means (3) because the angle of incidence of the light rays (11) is great enough to cause their reflection from the light gathering means (3), are reflected by the second ellipsoidal reflector (4) to the focusing cone (5) and then to the light gathering and projecting means (3) and projected to the object to be illuminated (15).

The anode end (21) of the arc lamp (1) is mounted on a metal base (9) having an aperture (16) on the first ellipsoidal reflector axis which permits the easy installation and removal of the arc lamp (1). The cathode end (22) of the arc lamp (1) is secured by a lamp support (6) and axially aligned with the ellipsoidal reflectors (2) and (4) by a spider finger support (8) originating from a cylindrical base support (7). In addition, the base support (7) serves to join the first and second ellipsoidal reflectors (2) and (4) respectively in an abutting relationship.

The focusing cone (5) is mounted to the lamp support (6) by means of bolts (12). The focusing cone (5) is positioned so as to reflect light rays (11) from the second ellipsoidal reflector (4) to the light gathering and projecting means (3).

A mount (17) for the second ellipsoidal reflector (4) serves to attach both reflectors to a bench or jig (19) with bolts (18).

Provision is made for cooling the supporting base (7), lamp support (6) and mount (17) by circulating a cooling fluid such as water through piping (20) which is in a heat exchange therewith.

Figures 2A, 2B, 2C, 2D:
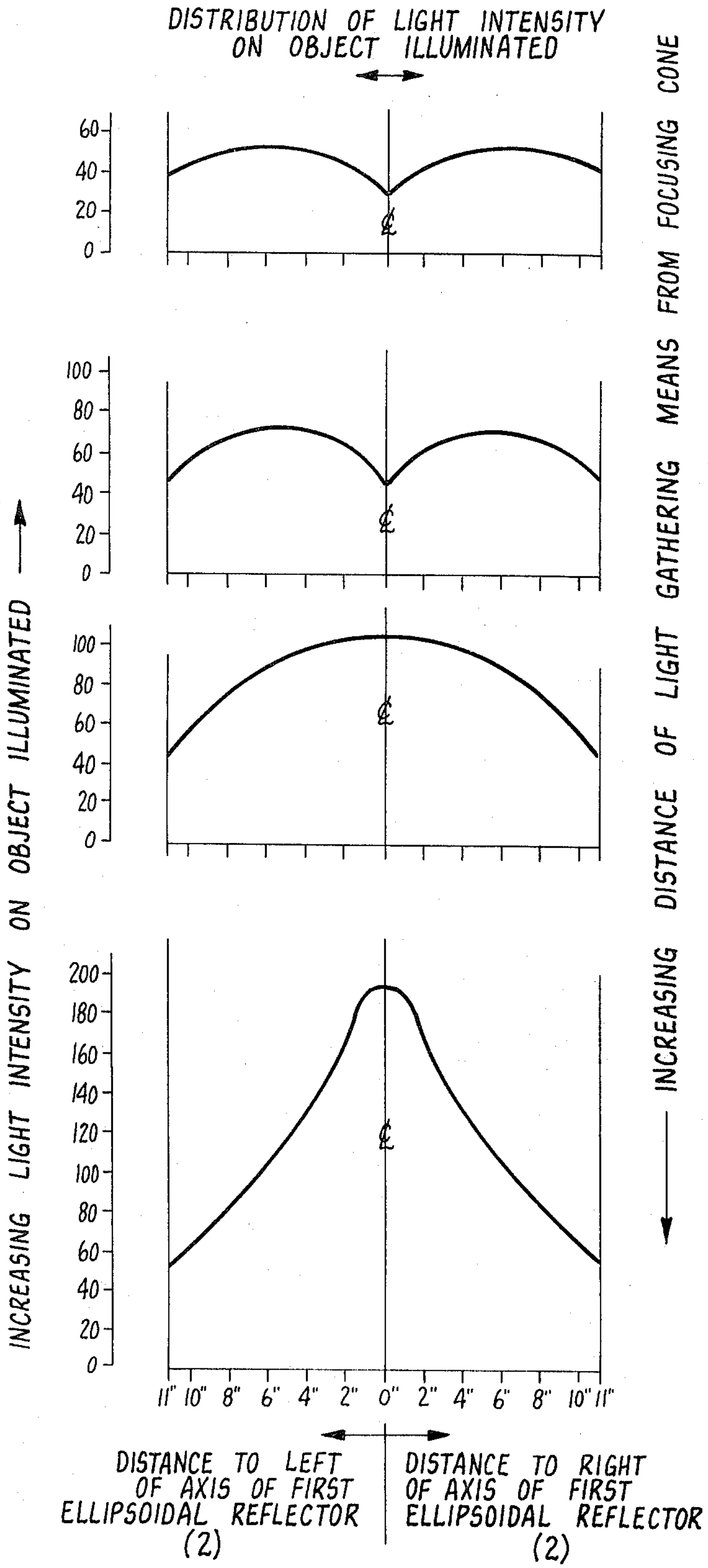
FIGS. 2(*a*) through 2(*d*) depict graphically the distribution of the light on the object illuminated as a function of distance of the light gathering means from the focusing reflector of the illuminator of FIG. 1.

FIGS. 2(*a*) through 2(*d*) depict the distribution of light intensities on the object illuminated (15) as a function of the distance of the light gathering means (3) from the focusing cone (5) for 5.95 inch diameter reflectors (2) and (4). If the object illuminated (15) is a color television tube, it is desirable to provide greater light intensity away from the center of the color television tube, while exposing it, as depicted by FIG. 2(*a*). Other applications require a greater light intensity in the center of the object illuminated as depicted by FIG. 2(*d*). Still other distributions as depicted by FIGS. 2(*b*) and 2(*c*) may be obtained by adjusting the distance between the light gathering means (3) and the focusing cone (5).

In operation, light rays (10) from arc lamp (1) are reflected from ellipsoidal mirror (2) to light gathering means (3) and projected to the object to be illuminated (15). Other light rays (11) from arc lamp (1) are reflected from ellipsoidal mirror (4) to focusing cone (5) and then to light gathering means (3) and projected to the object to be illuminated (15). Use of both reflectors (2) and (4) in concert with focusing cone (5) concentrates light for projection as a point source in a highly efficient manner. Any shadowing which might be produced by the spider finger support (8) is eliminated.

I claim:

1. A light projection apparatus comprising:

a. a first double focal point reflector having a major axis and first and second focal points along the major axis thereof;

b. a light source fixed at the first focal point of said first double focal point reflector such that at least some of the light rays therefrom are reflected by said first double focal point reflector to said second focal point thereof;

c. a second double focal point reflector having a major axis and first and second focal points along the major axis thereof, said major axis of said second reflector being aligned with the axis of said first reflector, said first focal point of said second double focal point reflector being substantially coincident with said first focal point of said first double focal point reflector and said second focal point of said second double focal point reflector being spaced from said second focal point of said first double focal point reflector.

d. light gathering and projecting means positioned on said axis approximately at said second focal point of said first double focal point reflector for projecting gathered light incident thereto, toward an object to be illuminated, as substantially a point source; and e. reflecting means having a central axis aligned with the major axes of said first and second reflectors and positioned approximately at said second focal point of said second double focal point reflector for focusing light reflected from said second double focal point reflector to said second focal point of said first double focal point reflector.

2. A light projection apparatus according to claim 1 in which said first and second double focal point reflectors are shaped as portions of ellipsoids of revolution.

3. A light projection apparatus according to claim 1 in which said first and second double focal point reflectors are shaped as portions of hyperbolas of revolution.

4. A light projection apparatus according to claim 1 in which said reflector means is conelike in shape having a concave surface.

5. A light projection apparatus according to claim 1 in which said light gathering and projecting means is a translucent hemisphere.

6. A light projection apparatus according to claim 2 in which said reflector means is conelike in shape having a concave surface.

7. A light projection apparatus according to claim 6 in which said light source is an arc lamp.

8. A light projection apparatus according to claim 7 wherein the position of said light gathering and projecting means is adjustable to vary the light intensity upon an object to be illuminated.

* * * * *